(12) United States Patent
Bui et al.

(10) Patent No.: US 10,141,016 B2
(45) Date of Patent: Nov. 27, 2018

(54) BALANCED DELAY AND RESOLUTION FOR TIMING BASED SERVO SYSTEMS

(71) Applicant: International Business Machines Corporation, Armonk, NY (US)

(72) Inventors: Nhan X. Bui, Tucson, AZ (US); Giovanni Cherubini, Rueschlikon (CH); Simeon Furrer, Altdorf (CH); Randy C. Inch, Tucson, AZ (US); Mark A. Lantz, Adliswil (CH); Angeliki Pantazi, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/439,760

(22) Filed: Feb. 22, 2017

(65) Prior Publication Data

US 2018/0240484 A1    Aug. 23, 2018

(51) Int. Cl.
G11B 5/584        (2006.01)
G11B 5/592        (2006.01)

(52) U.S. Cl.
CPC .................................. G11B 5/5926 (2013.01)

(58) Field of Classification Search
None
See application file for complete search history.

(56) References Cited

U.S. PATENT DOCUMENTS

| | | |
|---|---|---|
| 5,291,348 A | 3/1994 | Copolillo |
| 5,309,299 A | 5/1994 | Crossland et al. |
| 5,629,813 A | 5/1997 | Baca et al. |
| 6,021,013 A | 2/2000 | Albrecht et al. |
| 6,111,719 A | 8/2000 | Fasen |
| 6,831,805 B2 | 12/2004 | Chliwnyj et al. |
| 6,873,487 B2 | 3/2005 | Molstad |
| 6,940,682 B2 * | 9/2005 | Bui ........................ G11B 5/584 360/77.12 |
| 7,245,450 B1 | 7/2007 | Cherubini et al. |
| 7,393,066 B2 | 7/2008 | Dugas et al. |
| 7,411,759 B2 | 8/2008 | Trabert et al. |
| 7,903,368 B2 * | 3/2011 | Bui ........................ G11B 5/584 360/48 |
| 8,139,312 B2 * | 3/2012 | Bui ........................ G11B 5/584 360/77.12 |
| 8,422,162 B2 | 4/2013 | Cherubini et al. |

(Continued)

FOREIGN PATENT DOCUMENTS

EP    923078 A1    6/1999

OTHER PUBLICATIONS

Bui et al., U.S. Appl. No. 15/439,790, filed Feb. 22, 2017.

(Continued)

*Primary Examiner* — K. Wong
(74) *Attorney, Agent, or Firm* — Zilka-Kotab, P.C.

(57) ABSTRACT

A tape drive-implemented method, according to one embodiment, includes: determining a number of lateral position estimates to use for calculating a lateral position value, receiving lateral position estimates from a single servo channel, calculating the lateral position value by using the number of lateral position estimates, and using the lateral position value to control a tape head actuator. Other systems, methods, and computer program products are described in additional embodiments.

20 Claims, 14 Drawing Sheets

(56) References Cited

U.S. PATENT DOCUMENTS

| | | |
|---|---|---|
| 8,891,199 B2 | 11/2014 | Cherubini et al. |
| 9,058,828 B1 | 6/2015 | Cherubini et al. |
| 9,251,827 B2 | 2/2016 | Cherubini et al. |
| 9,524,741 B1 | 12/2016 | Cherubini et al. |
| 2004/0265635 A1 | 12/2004 | Ishiguro |
| 2008/0144211 A1 | 6/2008 | Weber et al. |
| 2011/0228421 A1 | 9/2011 | Watanabe |
| 2018/0240485 A1 | 8/2018 | Bui et al. |

OTHER PUBLICATIONS

List of IBM Patents or Patent Applications Treated as Related.

Pantazi, et al., "Nanoscale track-following for tape storage," 2015 American Control Conference (ACC), pp. 2837-2843, IEEE, 2015.

Cherubini et al., "High-Performance Servo Channel for Nanometer Head Positioning and Longitudinal Position Symbol Detection in Tape Systems," IEEE/ASME Transactions on Mechatronics, vol. 21, No. 2, Apr. 2016, pp. 1116-1128.

Ultrium LTO, "Why LTO Technology," Oct. 27, 2016, pp. 4, Retrieved From http://www.lto.org/.

Furrer et al., "Resolution Limits of Timing-Based Servo Schemes in Magnetic Tape Drives," IEEE Transactions on Magnetics, vol. 51, No. 11, Nov. 2015, pp. 1-4.

Lantz et al., "Servo-Pattern Design and Track-Following Control for Nanometer Head Positioning on Flexible Tape Media," IEEE Transactions on Control System Technology, vol. 20, No. 2, Mar. 2012, pp. 369-381.

Non-Final Office Action from U.S. Appl. No. 15/439,790, dated Jun. 15, 2017.

Final Office Action from U.S. Appl. No. 15/439,790, dated Nov. 29, 2017.

Notice of Allowance from U.S. Appl. No. 15/439,790, dated Jun. 8, 2018.

Bui et al., U.S. Appl. No. 16/045,610, filed Jul. 25, 2018.

Bui et al., U.S. Appl. No. 16/046,905, filed Jul. 26, 2018.

\* cited by examiner

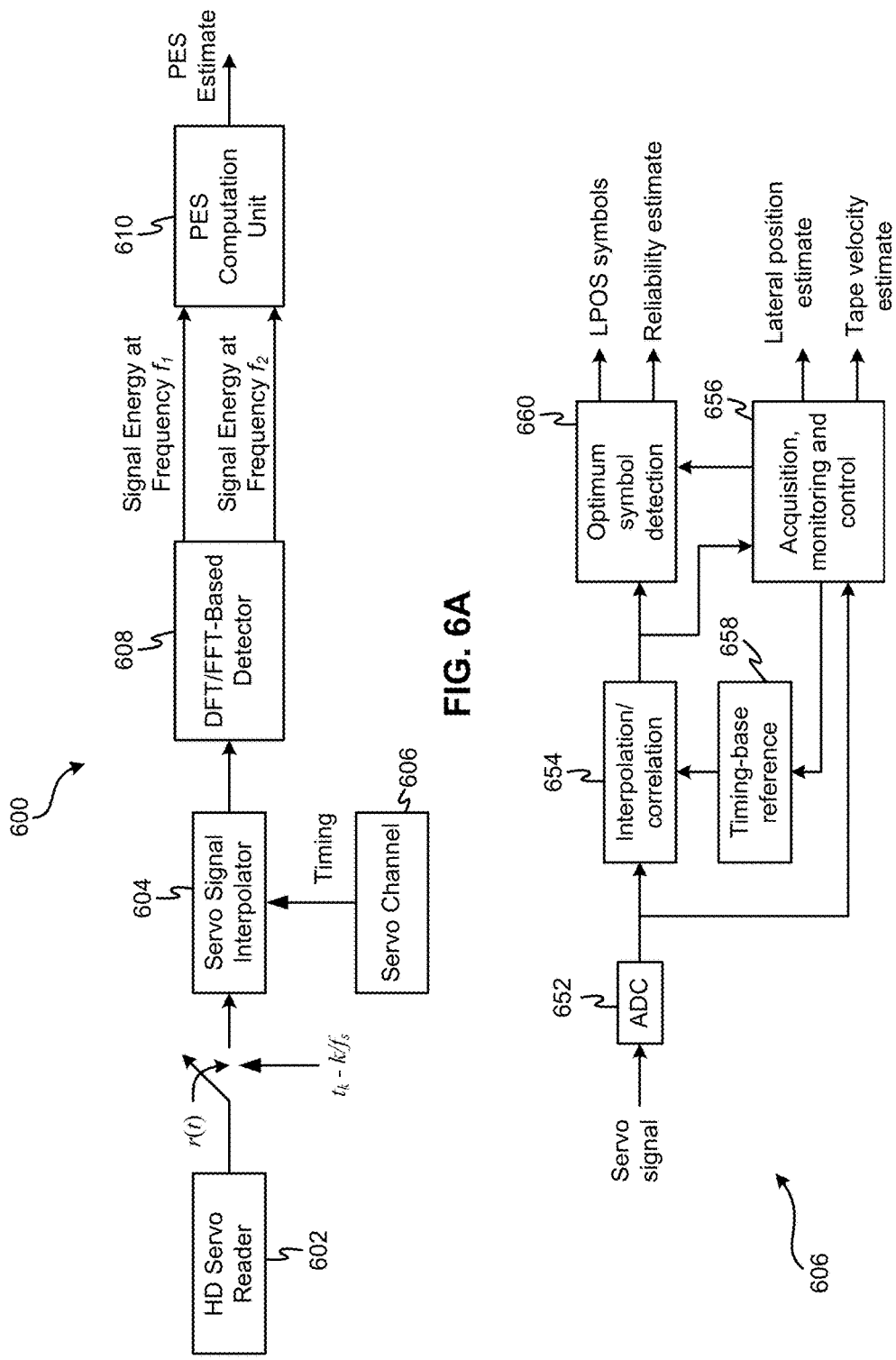

BALANCED DELAY AND RESOLUTION FOR TIMING BASED SERVO SYSTEMS

BACKGROUND

The present invention relates to data storage systems, and more specifically, to using timing-based servo systems to determine the position of a read/write head relative to a magnetic medium.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which run about parallel to a longitudinal axis of the tape. Data is recorded in the regions of tape located between pairs of the servo bands. In read/write heads of International Business Machines (IBM) linear tape-open (LTO) and Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, accurately controlling the lateral position of the head and/or skew of the head with respect to tape by using feedback generated by reading the TBS patterns becomes increasingly difficult. Conventional servo based implementations may not be sufficiently accurate to ensure adequate positioning of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths. Therefore it is desirable to achieve head lateral position estimates at both a repetition rate and an accuracy that ensures proper track-following operation even at low tape velocities and with large-bandwidth actuators.

SUMMARY

A tape drive-implemented method, according to one embodiment, includes: determining a number of lateral position estimates to use for calculating a lateral position value, receiving lateral position estimates from a single servo channel, calculating the lateral position value by using the number of lateral position estimates, and using the lateral position value to control a tape head actuator.

A computer program product, according to another embodiment, includes a computer readable storage medium having program instructions embodied therewith, the program instructions executable by a processor to cause the processor to: determine, by the processor, a number of lateral position estimates to use for calculating a lateral position value, receive, by the processor, lateral position estimates from a single servo channel, calculate, by the processor, the lateral position value using the number of lateral position estimates, and use, by the processor, the lateral position value to control a tape head actuator.

A tape drive, according to yet another embodiment, includes: a controller comprising logic integrated with and/or executable by the controller to cause the controller to: determine a number of lateral position estimates to use for calculating a lateral position value, receive lateral position estimates from a single servo channel, calculate a lateral position value by using the number of lateral position estimates, and use the lateral position value to control a tape head actuator.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A is a block diagram of a detector for HD patterns, according to one embodiment.

FIG. 6B is a partial block diagram of a servo channel for TBS patterns, according to one embodiment.

DETAILED DESCRIPTION

Figure 1:
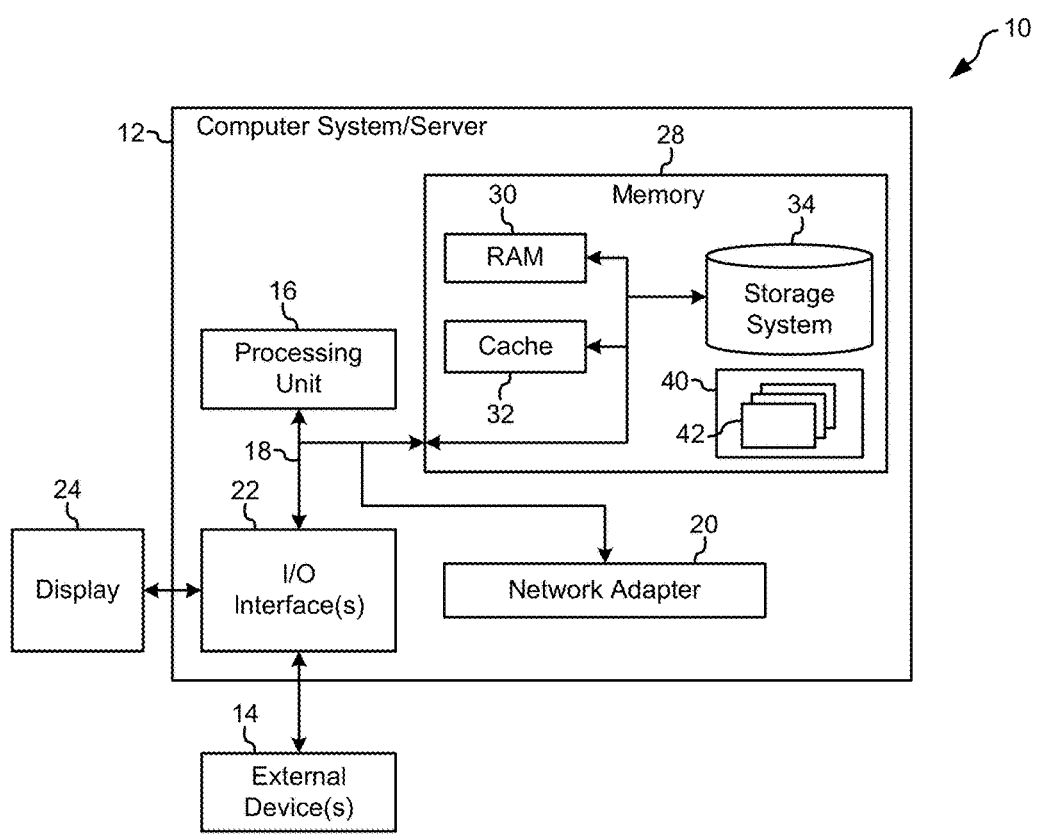
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for improved position estimation performance using servo patterns from magnetic tape. Some of the embodiments described herein have successfully reduced the effective noise floor and thereby improved the accuracy by which the position of a tape head may be estimated compared to what has been previously achievable. By combining a number of servo estimates from one or more servo readers, a more accurate position estimation of the tape head may be achieved. However, although combining more than one servo estimate allows for a more accurate determination of the position estimation of the tape head, it also introduces a delay in making such a determination. Thus, a trade-off between accuracy (resolution) of the position estimate, and delay may exist in the various embodiments described herein, as will be described in further detail below.

In one general embodiment, a tape drive-implemented method includes: determining a number of lateral position estimates to use for calculating a lateral position value, receiving lateral position estimates from a single servo channel, calculating the lateral position value by using the number of lateral position estimates, and using the lateral position value to control a tape head actuator.

In another general embodiment, a computer program product includes a computer readable storage medium having program instructions embodied therewith, the program instructions executable by a processor to cause the processor to: determine, by the processor, a number of lateral position estimates to use for calculating a lateral position value, receive, by the processor, lateral position estimates from a single servo channel, calculate, by the processor, the lateral position value using the number of lateral position estimates, and use, by the processor, the lateral position value to control a tape head actuator.

In another general embodiment, a tape drive includes: a controller comprising logic integrated with and/or executable by the controller to cause the controller to: determine a number of lateral position estimates to use for calculating a lateral position value, receive lateral position estimates from a single servo channel, calculate a lateral position value by using the number of lateral position estimates, and use the lateral position value to control a tape head actuator.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
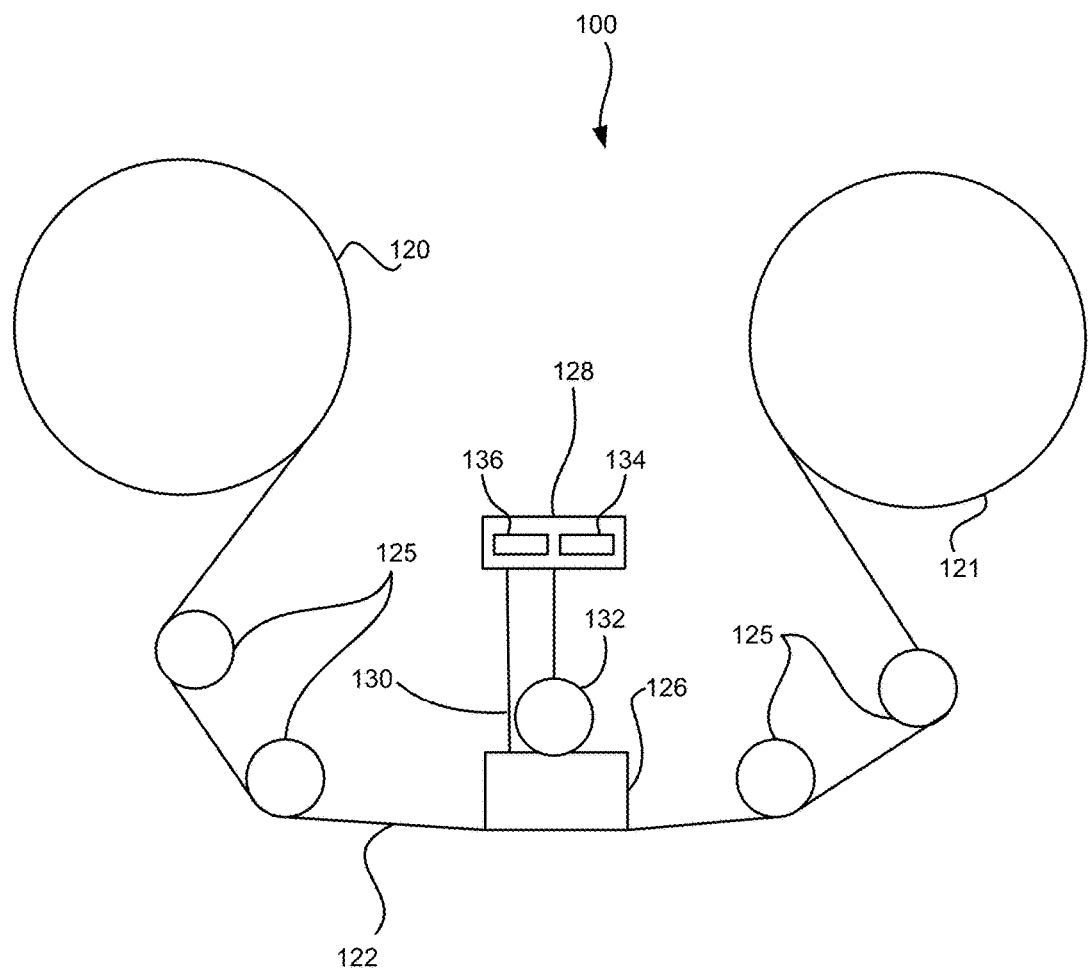
FIG. 2 illustrates a simplified tape drive of a tape-based data storage system, according to one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
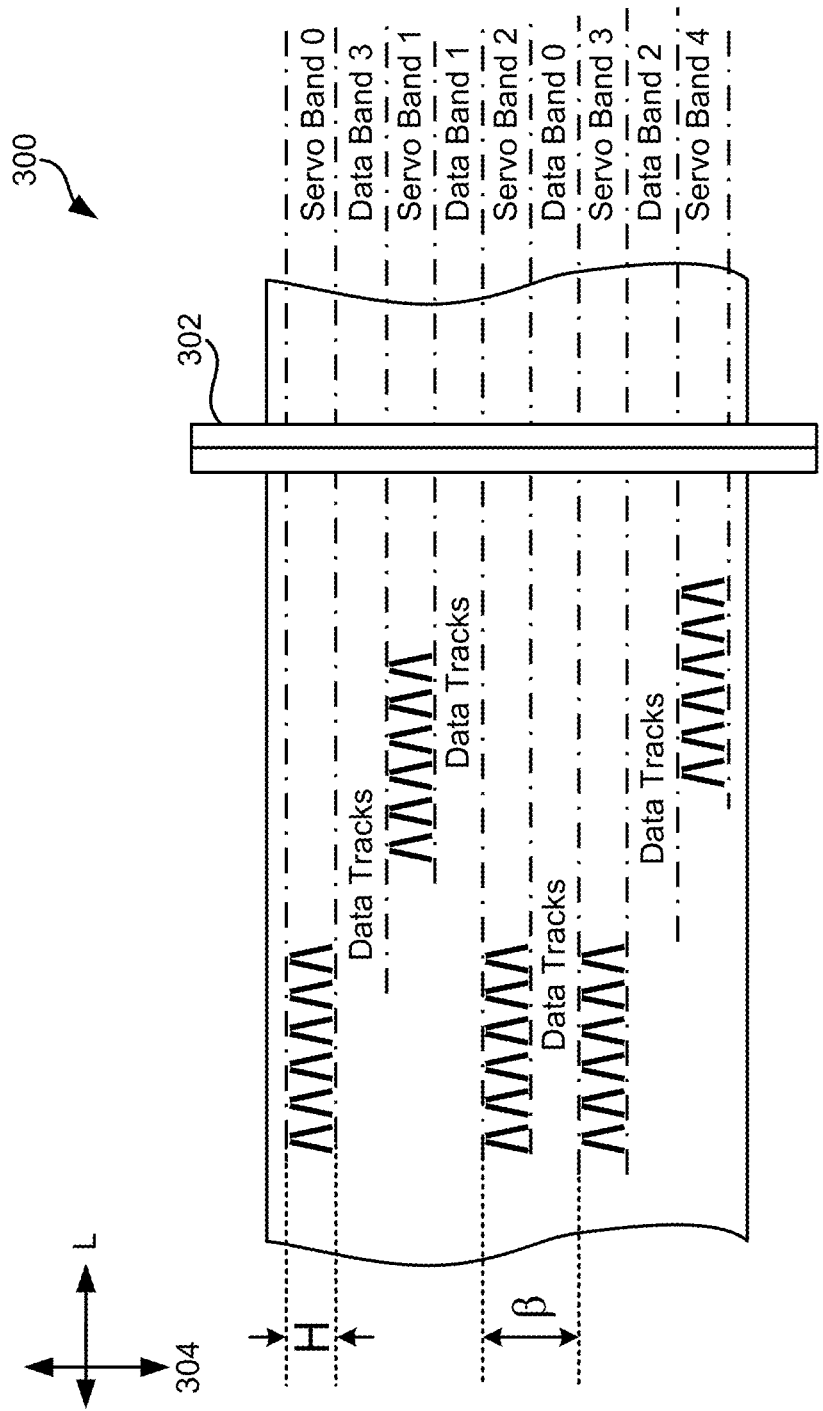
FIG. 3 illustrates a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the linear tape-open (LTO) format and IBM Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch $\beta$ between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives are configured to operate at low tape velocities and/or with nanometer head position requirements. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 terabytes (TB) and beyond.

However, according to some embodiments, magnetic tape may further be augmented with additional features that provide additional functionality. Accordingly, high-density (HD) servo patterns may be implemented in place of the standard TBS patterns, e.g., as seen in FIG. 3. The HD servo patterns may be used to improve track-following performance.

Figure 4A:
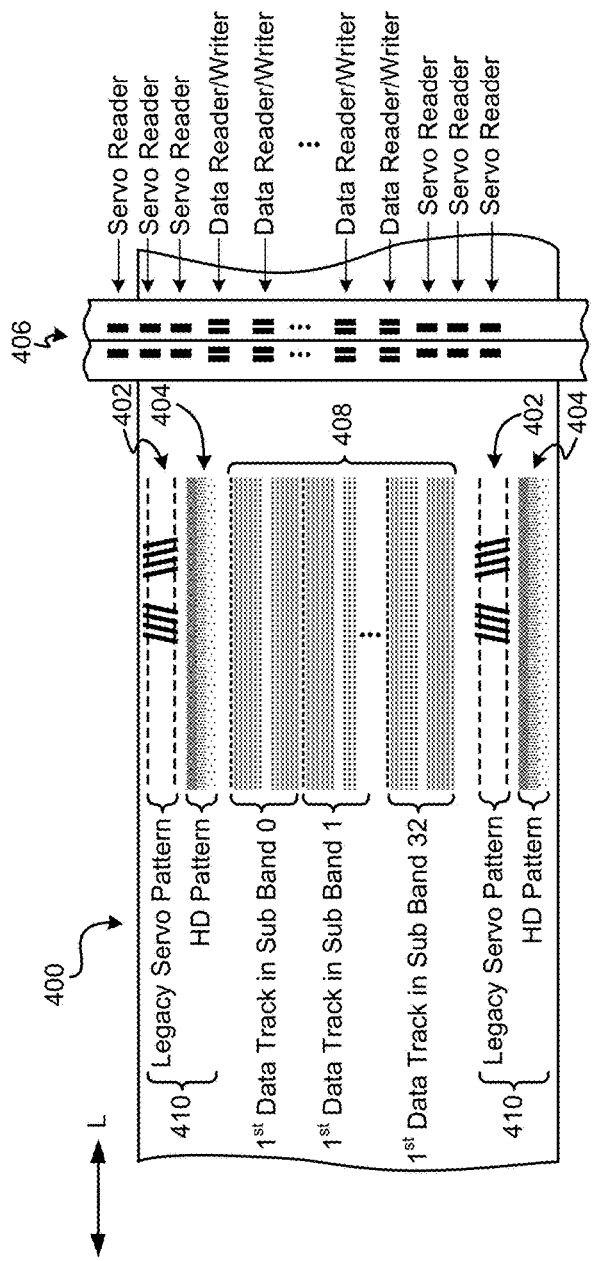
FIG. 4A is a hybrid servo pattern written in a dedicated area of a tape medium, according to one embodiment.

In still further embodiments, a standard TBS pattern (e.g., as shown in FIG. 3) may be implemented in combination with one or more HD servo patterns (e.g., see FIG. 4A). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

A hybrid servo pattern 410, which includes a standard TBS pattern 402 written in a servo track, as well as an HD pattern 404 that is written in a track (e.g., dedicated area) of the tape medium 408 is shown in FIG. 4A. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, LPOS information, etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

The tape layout 400 of FIG. 4A includes a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Figure 4B:
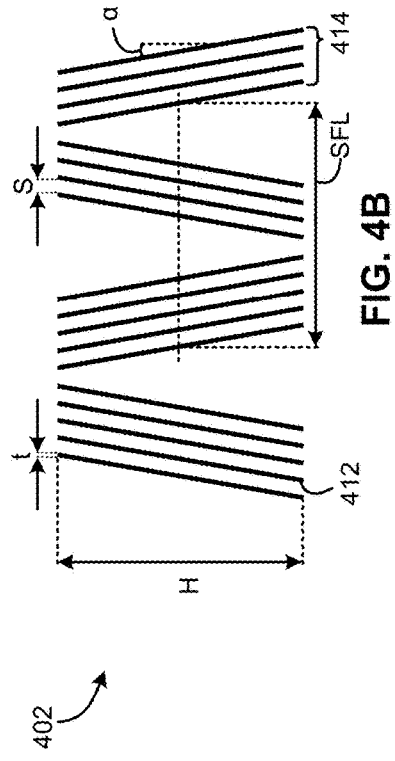
FIG. 4B is a partial detailed view of a TBS pattern, according to one embodiment.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 μm, and the angle α may be about 6°, while the thickness t is about 2.1 μm. Moreover, the spacing S between each of the servo stripes 412 and/or the sub-frame length SFL between servo bursts 414 having the same azimuthal slope may vary depending on the desired embodiment. According to an exemplary approach, which is in no way intended to limit the invention, the spacing S may be about 5 μm, while the sub-frame length SFL is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 of FIG. 4A may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 5B:
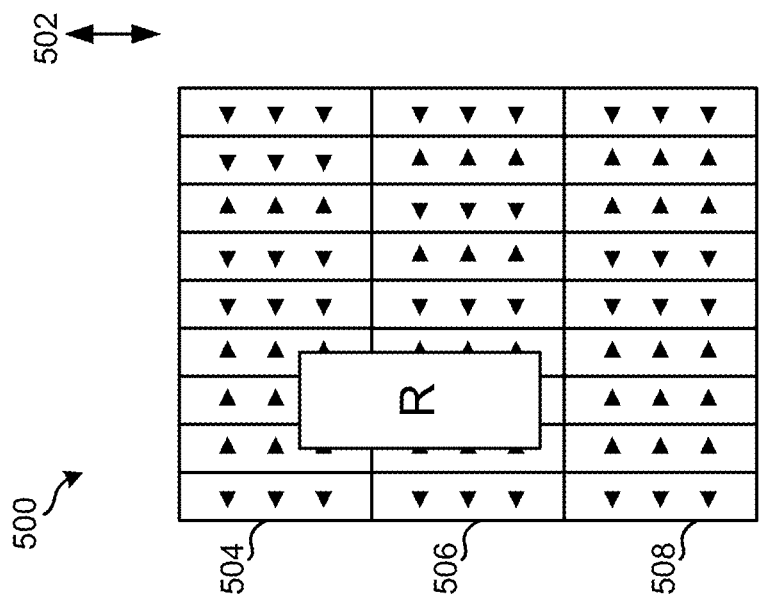
FIGS. 5A-5B is a high definition (HD) pattern, according to one embodiment.
Figure 5A:
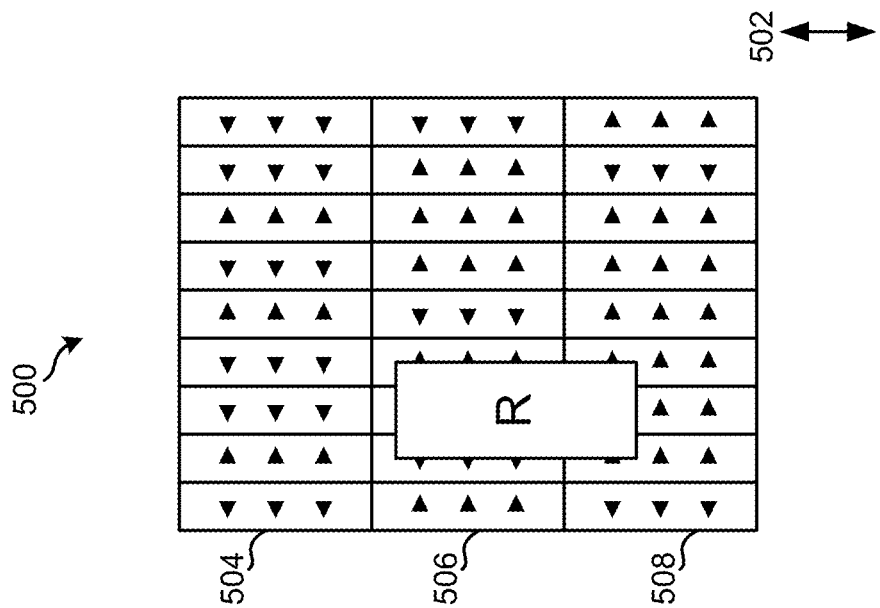

Looking to FIGS. 5A-5B, an HD pattern 500 is shown that overcomes the limited range of lateral head displacement associated with an HD pattern having only two periodic waveforms, characterized by two different spatial frequencies. As shown in FIGS. 5A-5B, at least three frequencies are used for the HD pattern in adjacent tracks, which repeat periodically across the band where the HD pattern is written. In the embodiment of FIGS. 5A-5B, the servo reader (denoted by the block labelled 'R') spans wider in the cross-track direction 502 than a single track, such that at least two tones are detected under any reading conditions at a given time when the servo reader R is positioned over the HD pattern. Looking specifically to FIG. 5A, the reader R spans across both the bottom portion 508 and middle portion 506 of the HD pattern 500. FIG. 5B illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 μm to about 150 μm, such as about 60 μm, about 75 μm, about 100 μm, etc., depending on the approach. Moreover, the symbol length may be in a range from about 0.5 μm to about 3.0 μm, e.g., such as about 1.0 μm, about 1.5 μm, about 2.0 μm, etc.

Note that the waveform periods of the three frequencies may be integer multiples of a period T, for example T=241.3 nm, which corresponds to the highest spatial frequency, which is proportional to 1/T, when spectral estimation by a discrete Fourier transform/fast Fourier transform—(DFT/FFT)-based detector with a minimum number of spectral bins for given integration interval is adopted.

FIG. 6A shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

Referring momentarily to FIG. 6B, a servo channel 606 to extract servo information from TBS signals is illustrated according to an exemplary embodiment, which is in no way intended to limit the invention. As shown, a servo signal is input to an analog-to-digital converter (ADC) 652 of the servo channel 606, which may in turn be provided to an interpolation/correlation module 654 and/or an acquisition, monitoring and control module 656. Moreover, an output from the timing-base reference 658 is also provided to the interpolation/correlation module 654. Acquisition, monitoring and control module 656 may output a lateral position estimate and/or a tape velocity estimate which may be further used, e.g., according to any of the approaches described herein. Furthermore, optimum signal detection module 660 may output LPOS symbols and/or a reliability estimate as shown.

Servo channel 606 may operate at a clock rate at which it samples the readback signal of a corresponding tape head. However, a processor which implements a controller capable of performing any one or more of the operations described below (e.g., with respect to methods 1100, 1400, 1500) may operate at a different clock rate.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
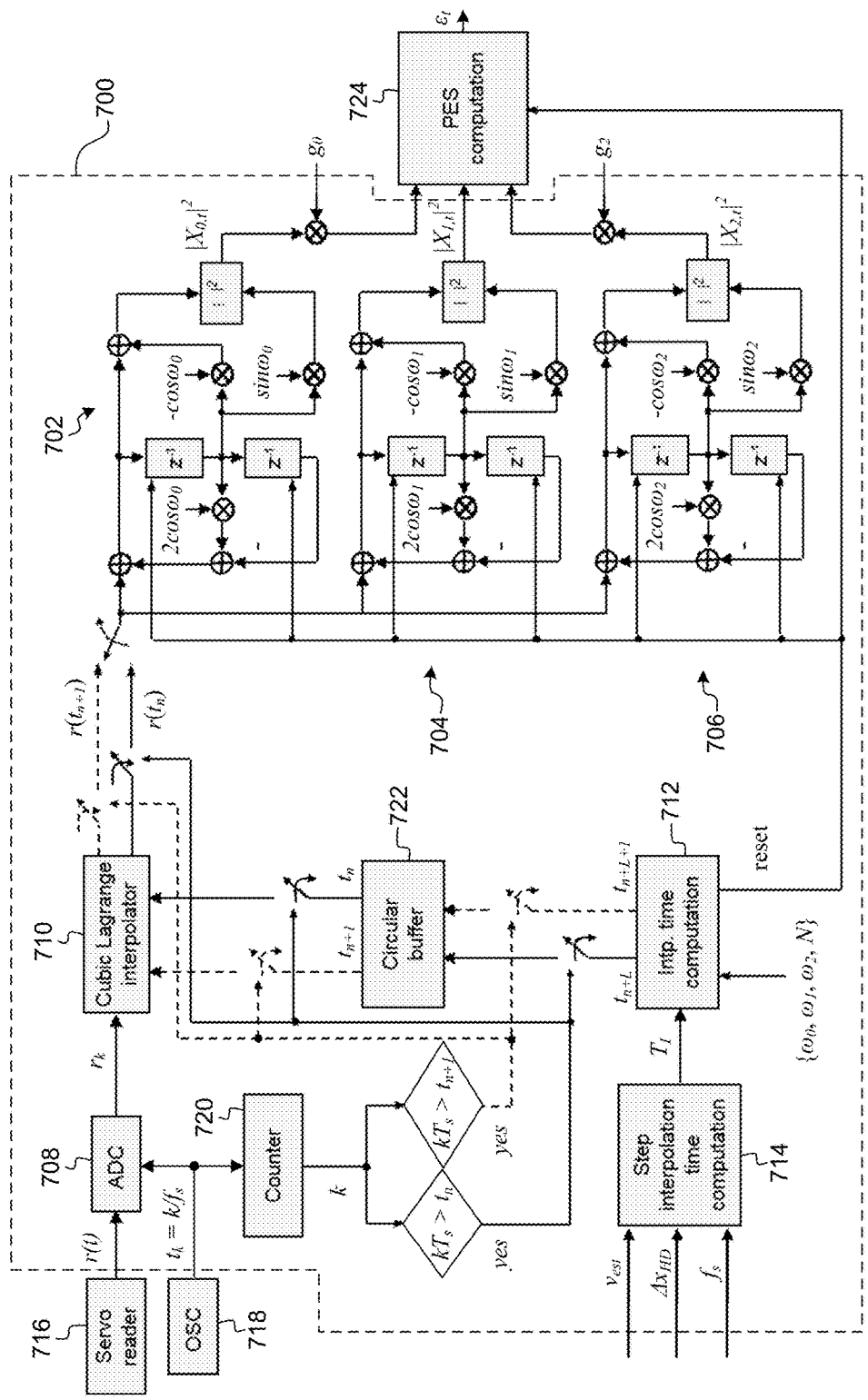
FIG. 7 is a block diagram of a detector for HD patterns, according to one embodiment.

Now looking to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the ADC 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover, the frequency $f_s$ of the clock 718 may be either a fixed frequency, a variable frequency, or selectively fixed or variable.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_1$ seconds, where $T_1$ denotes the time interval that it takes for the tape to travel over a distance equal to the step interpolation distance $\Delta x_{HD}$. The estimation of the time interval $T_1$ is performed by a step interpolation time computation unit 714, which computes $T_1=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_s/T_1$, where $T_s=1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

However, tape velocity during use may not be fixed for a given operation and/or between tapes. Moreover, tape drives are expected to operate over a range of tape speeds, e.g. in the range of 1 to 6 m/s, in order to match variable host data rates. The combination of fixed frame/sub-frame lengths of TBS patterns and the variable tape speed leads to a large range of update rates (e.g., frequencies) and a variable delay at which the position estimates are provided to the servo controller. Accordingly, an improved process of adjusting lateral position estimation resolution with respect to estimation delay and spatial frequency resolution may desirably be implemented, as will be described in further detail below.

Referring still to FIG. 7, in another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i = 2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i = 2\pi f_i$ from which the coefficients of the digital filters 702, 704, 706 are obtained. These frequencies may be obtained from the knowledge of the servo reader lateral position provided by the TBS channel in one embodiment, as described above. The number (N) is the number of samples over which the estimates of the energies of the periodic waveforms are computed. N determines the length of the integration interval, and therefore, also determines the spatial frequency resolution. Assuming N is even, N/2 is the number of frequencies for which energy estimates would be provided by a DFT/FFT-based HD detector that operates over N samples. N may be obtained from the tape drive memory in one embodiment.

Typically, N is about 100 or larger. Multiplication of the three energy estimates by gain factors $g_i$, for i=0, 1, 2, is provided to compensate for the different attenuations that the readback HD servo signal may experience at different frequencies, where the normalization $g_1 = 1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate ($\varepsilon_t$) at given time t.

Other components of the HD detector 700 may operate as would be known to one of skill in the art, and are omitted here for the sake of clarity of the described embodiments.

Figure 8:
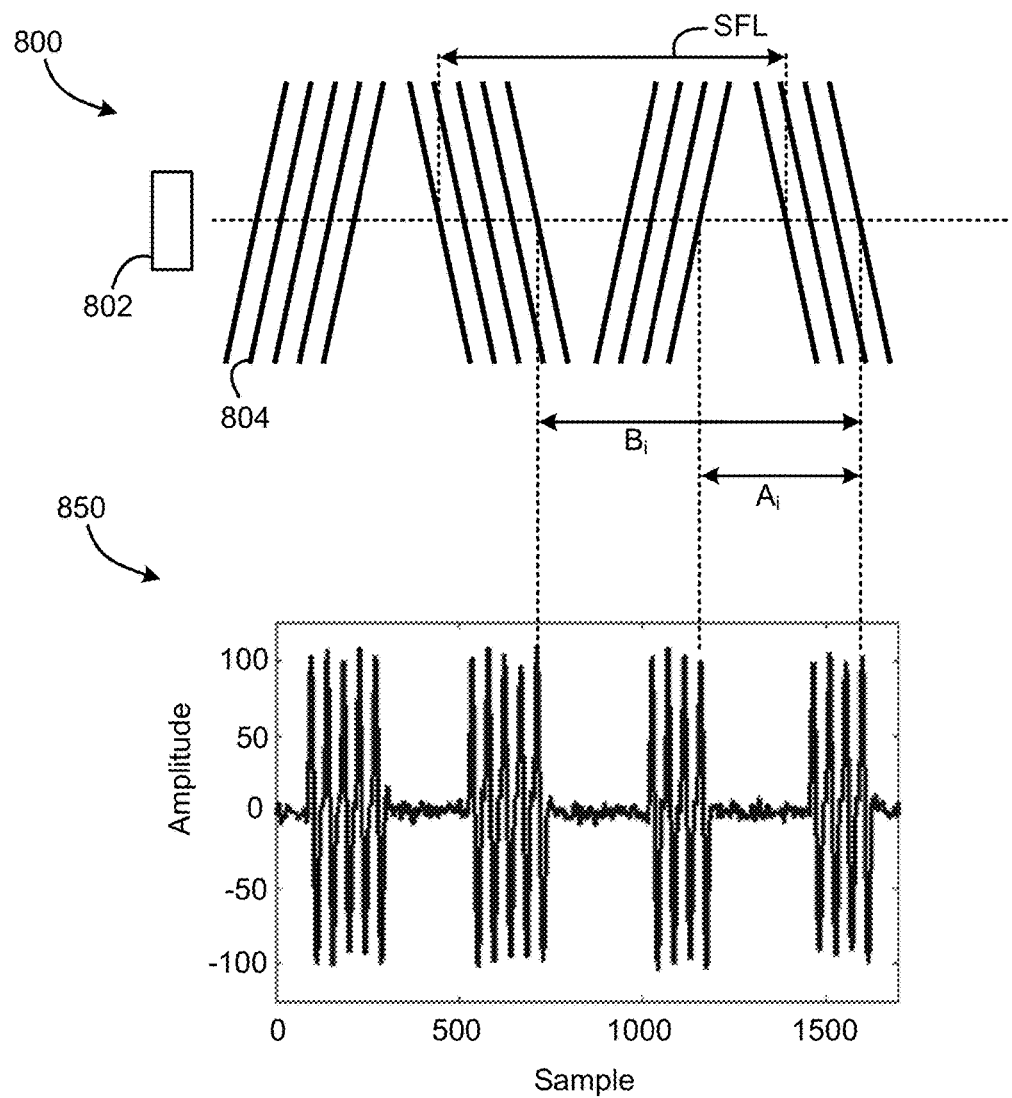
FIG. 8 is a detailed view of a servo frame and a corresponding graph of the signal amplitude read from servo stripes of the servo frame, according to one embodiment.

Looking now to FIG. 8, an exemplary servo frame of a TBS pattern 800 is illustrated according to one embodiment. It should be noted that TBS pattern 800 may include any one or more aspects of the TBS pattern included in FIG. 4B. Referring still to FIG. 8, graph 850 represents an exemplary readback signal produced by a servo reader 802 passing over each of the servo stripes 804. The servo readback signal represented by the plot in graph 850 includes dibit pulses, each of which correspond to one of the servo stripes 804 as shown.

This servo readback signal may be used to estimate the position of the tape head relative to the magnetic tape on which the TBS pattern 800 was written. During tape drive operation, a magneto-resistive servo read sensor scans over the servo patterns and produces a readback signal. A servo channel processes the servo readback signal and measures the time intervals between bursts of stripes/dibits to estimate the tape head lateral position relative to the servo pattern.

In some approaches, the "A-count" timing interval $A_i$ (corresponding to servo stripes having opposite azimuth angles) and the "B-count" timing interval $B_i$ (corresponding to parallel servo stripes) may be determined and used to calculate the lateral position estimate of the tape head. According to an example, which is in no way intended to limit the invention, "A-count" timing intervals $A_i$ and "B-count" timing intervals $B_i$ may be implemented in Equation 1 below.

$$\hat{y} = \frac{SFL}{2\tan(\alpha)}\left(\frac{1}{2} - \frac{\sum A_i}{\sum B_i}\right) \quad \text{Equation 1}$$

Thus, a servo pattern in a servo track may be used (e.g., read) to obtain the readback signal. The readback signal may in turn be used to compute a position estimate of the tape head which may be used in a track-following control system.

Once a position estimate has been determined, a track-following servo control loop may be used to calculate a PES by subtracting the desired position from the position estimate. Looking now to FIG. 9, an exemplary track-following servo control loop 900 is illustrated in accordance with one embodiment. As an option, the present servo control loop 900 may be implemented in conjunction with features from any other embodiment listed herein, such as those described with reference to the other FIGS. However, such servo control loop 900 and others presented herein may be used in various applications and/or in permutations which may or may not be specifically described in the illustrative embodiments listed herein. Further, the servo control loop 900 presented herein may be used in any desired environment. Thus FIG. 9 (and the other FIGS.) may be deemed to include any possible permutation.

The input to the servo control loop 900 is shown as being calculated by subtracting the desired position $y_{ref}$ from the position estimate $y_{pos}$, thereby forming the PES, as described above. Moreover, the PES is passed to a track-following compensator 902 (e.g., of conventional design) which in turn produces a signal $u_y$ which may be combined with vibration disturbances $d_v$ before being passed to a current driver (not shown) and an actuator control module 904. The input control signal provided to the actuator control module 904 is used to move the corresponding tape head in a desired direction based on the PES as would be appreciated by one skilled in the art after reading the present description. The signal y at the output of the actuator control module 904 indicates the lateral position of the tape head. Moreover, the signal y may be combined with lateral tape motion (LTM) disturbances $d_{LTM}$ before being passed to a delay module 906 and a remainder of a control system. LTM may be caused by imperfections in the tape transport system rollers, reels, motors, etc.

As shown, the output from delay module 906 is redirected back and used to determine the next PES corresponding to a subsequent servo sub-frame read by a servo reader. In doing so, the servo control loop 900 may be able to keep the tape head at a desired position relative to a magnetic tape to enable efficient writing to and/or reading from the magnetic tape.

Figure 10:
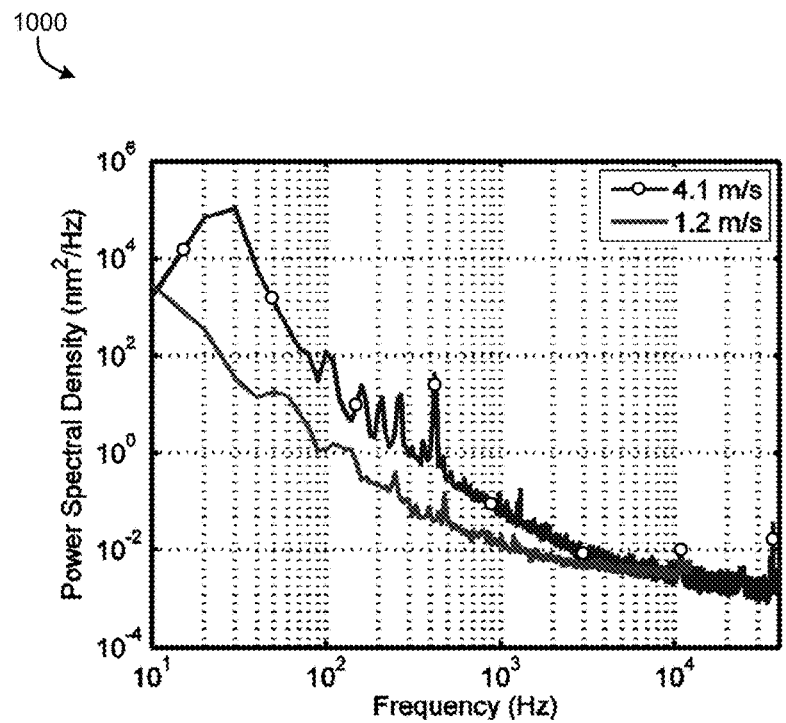
FIG. 10 is a graph plotting the power spectral density vs. frequency for two different tape speeds.

Looking to graph 1000 of FIG. 10, plots for power spectral density of LTM are shown for two different tape speeds. In other words, the plots included in graph 1000 correspond to LTM rather than any activation caused by a controller. Here, the LTM caused by transporting the tape from one reel to the other results in a higher amount of mechanical motion at lower frequencies than at higher frequencies. Tracking errors may be affected by position estimation resolution, system delay and/or sampling times, LTM at high and/or low tape speeds, mechanical coupling, vibration environments, etc. As the frequency increases, a noise floor dominated by estimation noise is typically reached. Thus, at higher frequencies, control loops may be limited by how accurately the position of the tape head may be estimated.

In order to lower the noise floor and thereby improve the accuracy by which the position of the tape head may be estimated compared to what has been previously achievable, various embodiments described herein may combine (e.g., average) a number of previous servo estimates from a single servo reader, or more than one servo reader. By combining more than one servo estimate over time or effectively some distance on tape, a more accurate determination of the position of the tape head may be achieved. However, although combining greater than one servo estimates allows for a more accurate determination of the position of the tape head, it also introduces a delay in making such a determination. Thus, a trade-off between accuracy (resolution) of the position estimate and delay may exist in the various embodiments described herein, as will soon become apparent.

Figure 11:
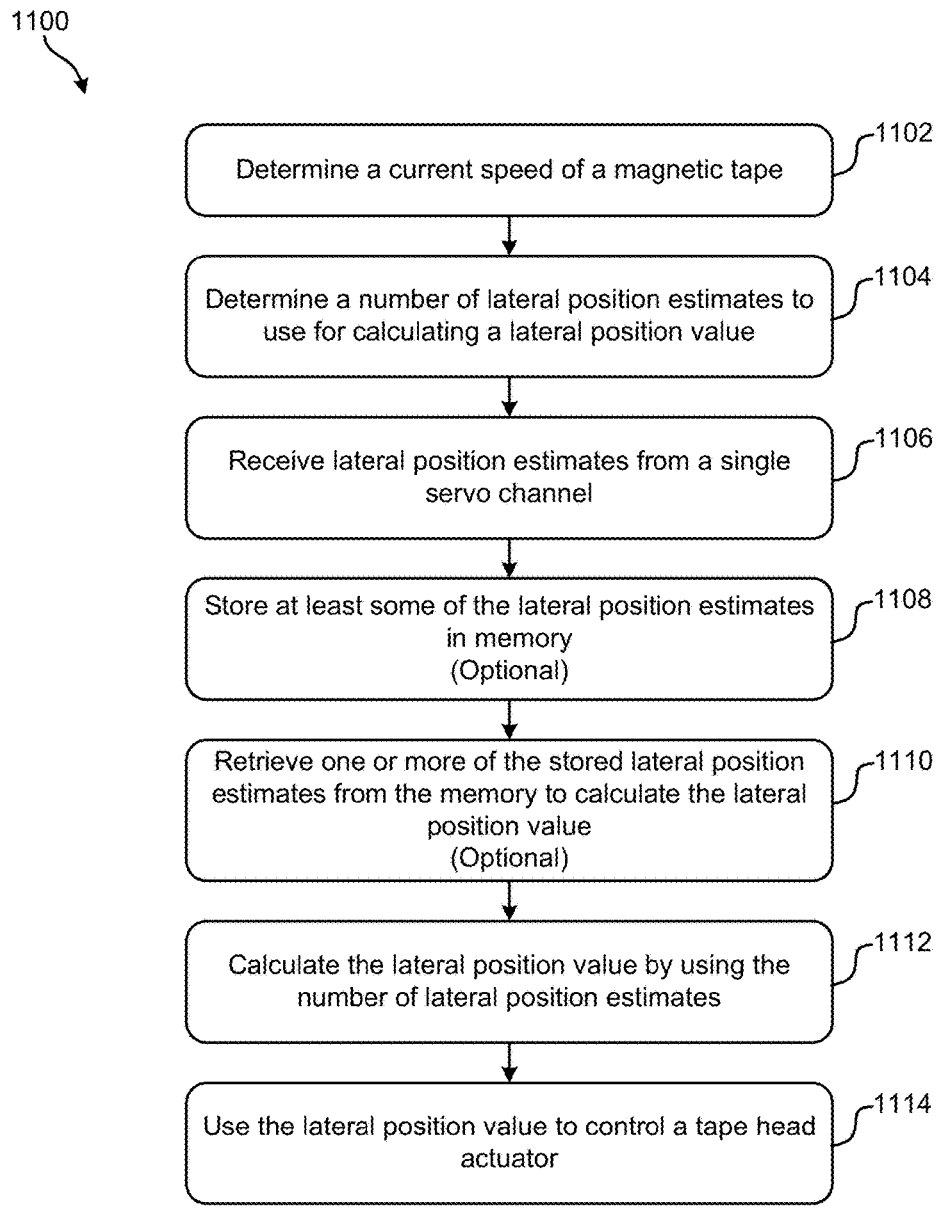
FIG. 11 is a flowchart of a method, according to one embodiment.

Looking to FIG. 11, a flowchart of a method 1100 is illustrated in accordance with one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in some embodiments, any one or more of the operations included in method 1100 may be performed or implemented by a tape drive (e.g., see 100 of FIG. 2). In other various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, operation 1102 includes determining a current speed of a magnetic tape, e.g., from a servo track on the magnetic tape. Moreover, operation 1104 of method 1100 includes determining a number of lateral position estimates to use for calculating a lateral position value. According to the present description, a "lateral position value" is intended to represent the current (or a most recently determinable) position of a tape head relative to a magnetic tape being passed thereover. Moreover, the lateral position value may be measured in a cross-track (lateral) direction (e.g., see 304 of FIG. 3).

By determining a number of lateral position estimates to use for calculating a lateral position value, operation 1104 may essentially be determining a sampling number for calculating the lateral position value. However, the number of lateral position estimates may also be considered a window length, where the lateral position value is calculated by incorporating all lateral position estimate samples in the window. Thus, the number of lateral position estimates incorporated at a given time depends on the length of the window. In such approaches, the window may be a sliding window which shifts when new estimates (samples) are introduced, e.g., such that the window includes the most recent samples from the servo channel.

As alluded to above, although using a larger number of lateral position estimates to calculate the lateral position value achieves a more accurate result, a corresponding amount of delay is also introduced. For example, it takes twice as long for a servo reader to pass over an amount of tape corresponding to a number of servo stripes needed to calculate 4 separate lateral position estimates than it does to pass over an amount of tape to calculate 2 lateral position estimates. Accordingly, there is a longer delay in receiving the 4 separate lateral position estimates than there is to receive the 2 lateral position estimates. As the number of lateral position estimates used to calculate a lateral position value increase, so does the delay. Thus, a trade-off between the accuracy (resolution) of the lateral position value and the delay in determining the lateral position value exists.

According to various embodiments described herein, this trade-off between accuracy and delay may desirably be optimized as a function of tape speed, as tape speed may change multiple times during operation. Changes in tape speed may result from host system processing bandwidth, the rate at which data is received, available throughput, etc. Although delay increases with the number of lateral position estimates used to calculate a lateral position value, the actual amount of delay depends on the speed at which the tape is being passed over the servo readers. For example, at lower tape speeds (e.g., from about 1 m/s to about 3 m/s), the amount of delay associated with determining 3 separate lateral position estimates is greater than the amount of delay associated with determining 3 separate lateral position estimates from a tape traveling at faster speeds. This is because faster tape speeds (e.g., from about 4 m/s to about 9 m/s) allow for the servo reader to read a larger number of servo patterns per unit of time than at lower tape speeds, thereby allowing for the lateral position estimates to be determined more often for faster tape speeds. It follows that a greater number of lateral position estimates may be used to calculate a lateral position value when tape speeds are high (thereby maintaining the resulting delay within desired limits), while a lower number of lateral position estimates may be used to calculate a lateral position value when tape speeds are low (as the delay associated with lateral position estimation is larger). In other words, the lateral position estimation delay is large at low tape speeds, e.g., due to fixed sub-frame lengths in TBS patterns, while lateral position estimation delays are low at high tape speeds. In some approaches, the tape speed may be so low that only one lateral position estimate may be used for calculating the lateral position value, e.g., each position estimate is used by the track-following servo control loop as the lateral position value.

Figure 12A:
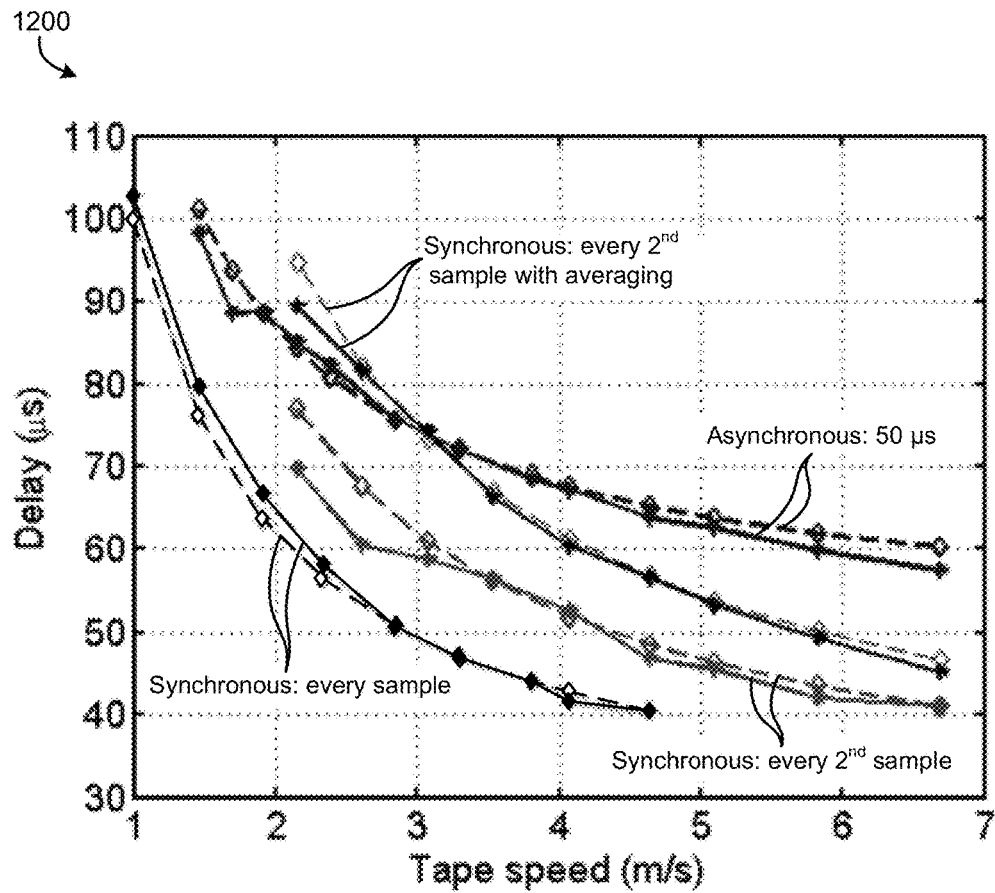
FIG. 12A is a graph plotting the delay vs. tape speed for various different embodiments.

Referring momentarily to FIG. 12A, graph 1200 depicts results which illustrate the above-mentioned interrelationship between tape speed and system delay for various implementations of a track-following system. As shown, delays are greatest at low tape speeds; but as tape speeds increase, the delays decrease accordingly for each of the plots. Moreover, this relationship was confirmed in experiments run using a servo channel/controller implemented in a field-programmable gate array (FPGA) board (represented in graph 1200 by the solid plot lines), as well as simulations run using system parameters $T_{comp}$=24 µs and $\alpha$=1 (represented in graph 1200 by the dashed plot lines).

It follows that the number of lateral position estimates determined in operation 1104 to be used for calculating the lateral position value may depend on (be based on) the speed of tape in some approaches. Again, the lower amounts of delay seen in graph 1200 as corresponding to faster tape speeds allow for more lateral position estimates to be gathered and used to calculate a lateral position value, while the high amounts of delay associated with lower tape speeds does not. Accordingly, operation 1102 may be performed when the current speed of the magnetic tape is desired in order to determine the number of lateral position estimates. However, in some approaches the number of lateral position estimates may be determined based on other information. For instance, the number of lateral position estimates determined in operation 1104 may be based on any one or more of tape speed, vibration conditions, media type, mechanical coupling, environmental conditions, imperfections in the tape transport system, etc.

Figure 12B:
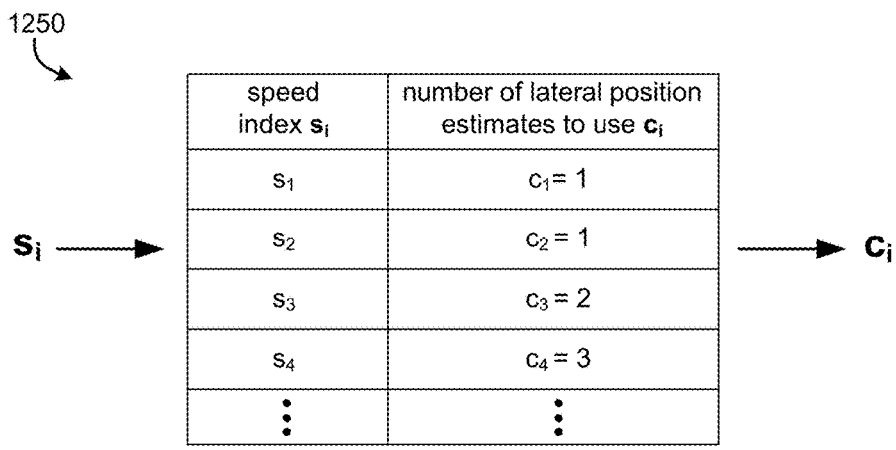
FIG. 12B is a representative view of a lookup table, according to one embodiment.

According to an example, which is in no way intended to limit the invention, the number of lateral position estimates may be determined by using a lookup table (e.g., stored in memory) or the like. The lookup table may define how many lateral position estimates should be combined (e.g., averaged) as a function of a tape speed index $s_i$ (velocity of tape), e.g., before being used in a track-following control loop. Looking momentarily to FIG. 12B, an exemplary lookup table 1250 is illustrated. As shown, a speed index $s_i$ input is applied to determine the number of lateral position estimates $c_i$ to use when calculating the lateral position value. Moreover, the number of lateral position estimates may thereby be output and applied when performing operation 1104. The entries in lookup table 1250 of FIG. 12B may be determined using an equation. According to some approaches, the entries in lookup table 1250 of FIG. 12B may be determined using Equation 2 below. It should also be noted that lookup table 1250 may incorporate additional input parameters which may be used to determine the number of lateral position estimates $c_i$ to use/output therefrom. Additional inputs related to vibration conditions, media types, environmental conditions (e.g., temperature, humidity, etc.), etc. Moreover, the contents of the lookup table 1250 may be static in some approaches, whereby the outputs are fixed relative to given input values. However, in other approaches the contents of the lookup table 1250 and/or their interrelationships may be adaptive.

Referring again to method 1100, operation 1106 includes receiving lateral position estimates from a single servo channel. As described above, a lateral position estimate may be calculated from timing intervals gleaned from the servo patterns in a servo track by a servo reader and servo channel. According to a specific approach, one or more lateral position estimates may be calculated from timing intervals by implementing Equation 1 above using the signals read by a corresponding servo reader. Moreover, each of the lateral position estimates may be determined from a respective sub-frame (e.g., see SFL of FIGS. 4B and 8) of a TBS pattern (e.g., frame) in a servo track on a magnetic tape. Accordingly, the number of lateral position estimates received may depend on the rate at which the servo estimates are being calculated, the speed of tape, an amount of processing bandwidth, etc., depending on the desired embodiment. In some approaches, the lateral position estimate may also include (e.g., be supplemented by) a tape velocity estimate, tape skew estimate (relative to an orientation of a magnetic head), etc., derived by a servo channel as would be appreciated by one skilled in the art after reading the present description. Moreover, supplemental values may be calculated using one or more of the additional estimates received. For instance, a magnetic tape velocity value may be calculated using received tape velocity estimates, a magnetic tape skew value (relative to an orientation of the magnetic head) may be calculated using received tape skew estimates, etc., depending on the desired approach. Once calculated, the supplemental values may be combined with a lateral position value before being used to control a tape head actuator, as will be described in further detail below (e.g., see operation 1114).

It should be noted that although operation 1106 includes receiving lateral position estimates from a single servo channel, lateral position estimates may also be received from other servo channels, e.g., as will be described in further detail below.

Although lateral position estimates may be received from a servo reader and servo channel, in some approaches, lateral position estimates may be retrieved from memory. It follows that lateral position estimates received from a servo channel may be stored in memory such that they may be available for future use. Accordingly, optional operation 1108 includes storing at least some of the lateral position estimates received in operation 1106, in a designated location in memory. The number of previously received lateral position estimates stored in memory may depend on the desired approach. The previously received lateral position estimates may be stored in a shifting manner, whereby an oldest one or more of the lateral position estimates stored in memory are replaced by a newly received one or more lateral position estimates, e.g., in a first-in-first-out (FIFO) or ring-buffer. It follows that the number of lateral position estimates stored in memory at any given time may be fixed. However, the number of lateral position estimates stored in memory at a given time may vary. In various approaches, the memory may be of any desired type (e.g., a buffer, a lookup table, history, registers, etc.) and may at least be electrically coupled to the device performing the operations of method 1100.

Moreover, optional operation 1110 also includes retrieving one or more of the stored lateral position estimates from the memory to calculate the lateral position value. Again, although lateral position estimates may be received from a servo channel, in some approaches, lateral position estimates may be retrieved from memory in order to calculate the lateral position value. Thus, depending on the desired approach, any number of lateral position estimates previously stored in memory may be retrieved and preferably used to calculate a new lateral position value.

Accordingly, method 1100 includes calculating the lateral position value by using the number of lateral position estimates. See operation 1112. Depending on the approach, the number of lateral position estimates may be used to calculate the lateral position value differently. For instance, in some approaches the lateral position value may be calculated by determining the arithmetic mean ("normal" average) of the number of lateral position estimates, e.g., according to a sampling number. However, in other approaches the lateral position value may be calculated by implementing a weighted averaging, e.g., such that a higher weight is assigned to the most recent sample(s), and a lower weight is assigned to older samples. In some approaches, the way in which the lateral position value is calculated may depend on the number of lateral position estimates that are available.

Figure 9:
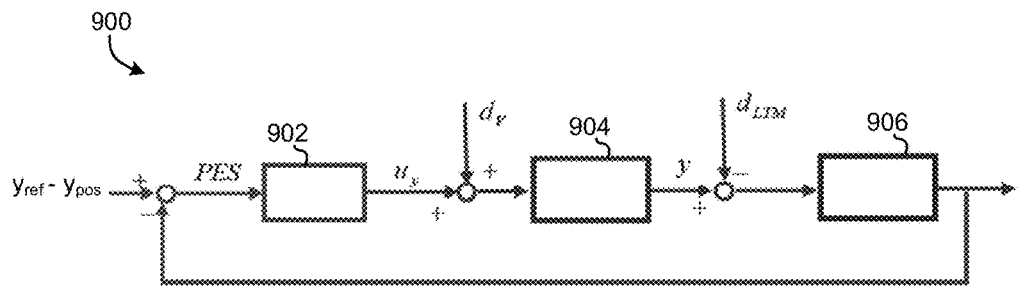
FIG. 9 is a block diagram of a track-following servo control loop, according to one embodiment.

Furthermore, operation 1114 includes using the lateral position value to control a tape head actuator. Once a current lateral position value corresponding to the position of a tape head relative to a magnetic tape has been determined (e.g., calculated), it is preferably used to adjust the position of the tape head, e.g., in a conventional matter. Moreover, additional values may also be used to control the tape head actuator. For example, the lateral position value may be supplemented by a magnetic tape velocity value, a magnetic tape skew value, etc. According to some approaches, the lateral position value may be sent to a track-following actuator, a current driver for the track-following actuator, and/or a controller coupled to the track-following actuator. For example, operation 1114 may include implementing the lateral position value in a track-following servo control loop, e.g., as shown in FIG. 9.

It should be noted that the operations included in method 1100 may be repeatedly performed during run-time, e.g., while writing to, reading from, performing a coarse look-up on, etc. a magnetic tape. Moreover, according to different approaches, the operations included in method 1100 may be performed synchronously with the servo frames dependent upon tape speed, or asynchronously independent of tape speed. According to a synchronously implemented example, the operations included in method 1100 may be performed in direct response to passing over another sub-frame, thereby resulting in a new lateral position estimate being determined. However, an asynchronously implemented example may include the operations in method 1100 being performed at a predetermined frequency, such as 20 kHz.

As mentioned above, although method 1100 includes receiving lateral position estimates from only a single servo channel, lateral position estimates may also be received from other servo channels. In some approaches, more than one lateral position estimate from a first servo track read by a first servo reader may be combined (e.g., averaged) with more than one lateral position estimate from a second servo track read by a second servo reader. For example, lateral position estimates may be received from two servo channels, three servo channels, four servo channels, multiple servo channels, etc., and may be combined (e.g., averaged together) to form a combined lateral position value. By combining lateral position estimates received from more than one servo track read by more than one servo reader, the accuracy (resolution) of the resulting lateral position value is improved because each of the servo readers may estimate the same lateral position, but the noise corresponding to the lateral position estimate made by each of the servo readers is uncorrelated.

Thus, the noise in the estimate may be reduced, thereby allowing a control loop to operate at a lower rate, while maintaining an improved PES performance. Moreover, a lateral position value formed by combining lateral position estimates from two or more parallel servo channels may be buffered in some approaches, e.g., such that it may be provided to a microcontroller at a reduced interrupt rate.

Figure 13:
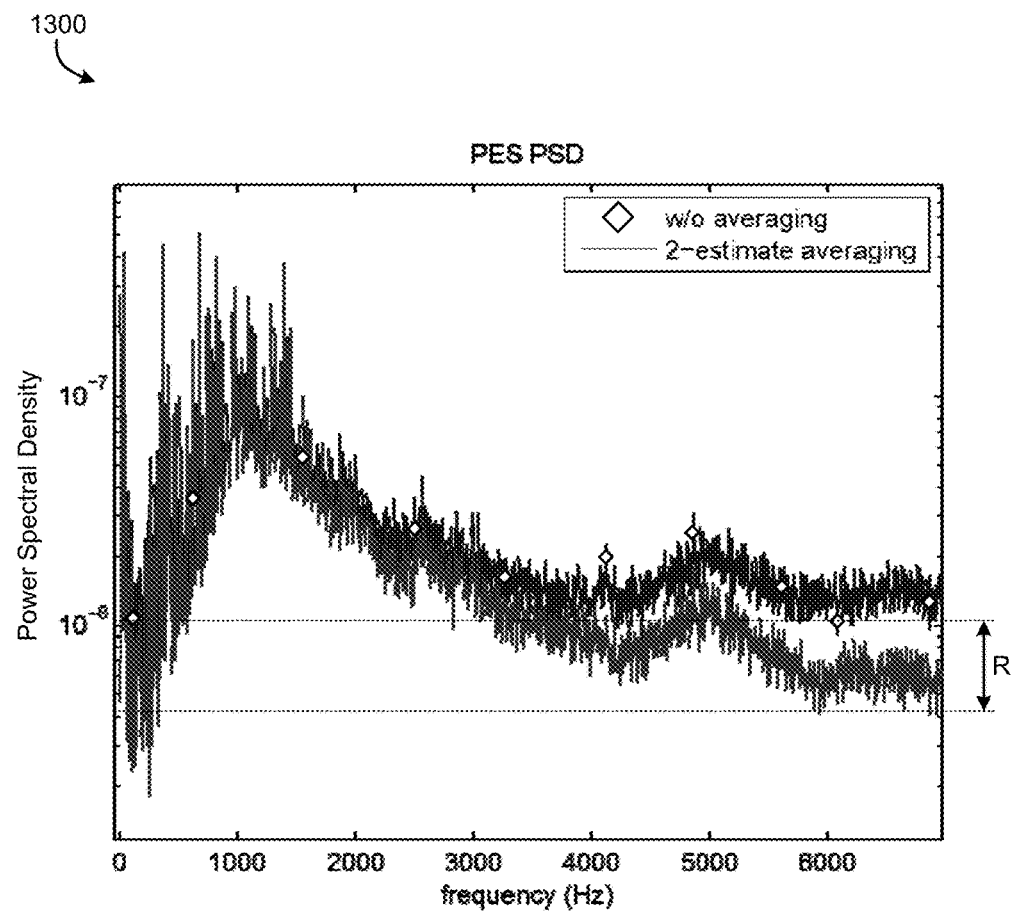
FIG. 13 is a graph plotting the power spectral density vs. frequency for two different embodiments.

Looking to graph 1300 of FIG. 13, a power spectral density plot for a PES corresponding to an approach which has averaged two lateral position estimates, each received from a single servo channel, compared to a conventional implementation which simply uses a single lateral position estimate (without implementing any calculations). It should be noted that both plots correspond to the same operating frequency of the track-following control loop. As shown, mechanical tape motion at low frequencies (e.g., lower than about 2 kHz) remain about the same for both plots. However, the noise floor for the power spectral density plot for the embodiment averaging two lateral position estimates is significantly lower than that of the plot for the conventional implementation. This reduction R in the noise floor results from being able to achieve a better estimate of the position achieved by some of the embodiments as described herein.

Figure 14:
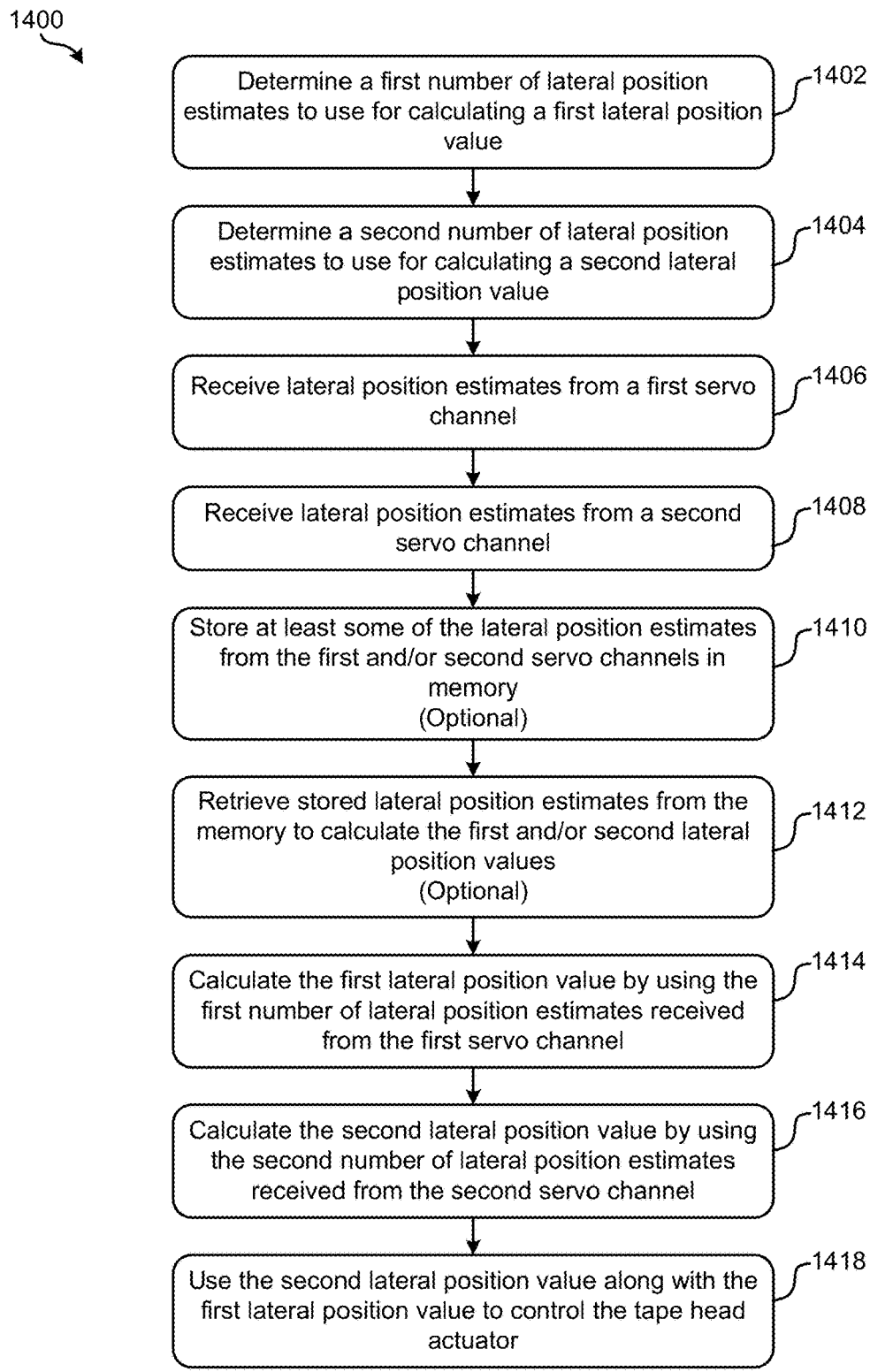
FIG. 14 is a flowchart of a method, according to one embodiment.

Looking now to FIG. 14, a flowchart of a method 1400 is illustrated in accordance with one embodiment. The method 1400 may be performed in accordance with the present invention in any of the environments depicted in FIGS. 1-10, among others, in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in some embodiments, any one or more of the operations included in method 1400 may be performed or implemented by a tape drive (e.g., see 100 of FIG. 2). In other various embodiments, the method 1400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, operation 1402 includes determining a first number of lateral position estimates to use for calculating a first lateral position value, while operation 1404 includes determining a second number of lateral position estimates to use for calculating a second lateral position value. As mentioned above, the number of lateral position estimates used to calculate a lateral position value may depend on the tape speed. Again, each of the lateral position estimates may be determined from a respective sub-frame of a respective TBS track on a magnetic tape.

Faster tape speeds may allow for a greater number of lateral position estimates to be used to calculate the lateral position value, thereby achieving a more accurate value without introducing an undesirable amount of delay in doing so. However, slower tape speeds may call for a fewer number of lateral position estimates to be used in calculating the lateral position value, thereby sacrificing accuracy in order to avoid detrimental delay. However, determining the first and/or second number of lateral position estimates to use for calculating the respective lateral position value may vary depending on one or more of the following parameters: vibration conditions, media type, mechanical coupling, environmental conditions, imperfections in the tape transport system, etc.

According to some approaches, the second number of lateral position estimates may be determined according to (based on) the first number of lateral position estimates. In other words, the first and second number of lateral position estimates may be the same in some approaches. However, the first and second number of lateral position estimates may be different, e.g., depending on the desired embodiment.

Moreover, operation 1406 includes receiving lateral position estimates from a first servo channel, and operation 1408 includes receiving lateral position estimates from a second servo channel that is preferably different than the first servo channel. In some approaches, the first and second servo channels may correspond to servo tracks read by respective servo readers on opposite sides of a data band on a magnetic tape (e.g., see FIG. 4A). However, in other approaches, the first and second servo channels may correspond to servo tracks on the same side of a data band on a magnetic tape, read by two different servo readers.

Optional operation 1410 includes storing at least some of the lateral position estimates from the first and/or second servo channels in memory, e.g., according to any of the approaches described above. Again, although lateral position estimates may be received from a servo channel, in some approaches, lateral position estimates may be retrieved from memory in order to calculate a corresponding lateral position value. Thus, depending on the desired approach, any number of lateral position estimates previously stored in memory may be retrieved and preferably used to calculate a new lateral position value. Accordingly, optional operation 1412 may include retrieving stored lateral position estimates from the memory to calculate the first and/or second lateral position values.

Referring still to method 1400, operation 1414 includes calculating the first lateral position value by using the first number of lateral position estimates received from the first servo channel. Moreover, operation 1416 includes calculating the second lateral position value by using the second number of lateral position estimates received from the second servo channel. Depending on the approach, the number of lateral position estimates may be used to calculate the first and/or second lateral position values differently. For instance, in some approaches the first and/or second lateral position values may be calculated by averaging the number of lateral position estimates, e.g., according to a sampling number. However, in other approaches the first and/or second lateral position values may be calculated by implementing a weighted averaging, e.g., such that a higher weight is assigned to the most recent sample(s), and a lower weight is assigned to older samples. In some approaches, the way in which the first and/or second lateral position values are calculated may depend on the corresponding number of lateral position estimates that are available.

Furthermore, operation 1418 includes using the second lateral position value along with the first lateral position value to control the tape head actuator. According to some approaches, the first and second lateral position values may be averaged together to form an average lateral position value which may then be used to control the tape head actuator, e.g., in a conventional manner. However, in other approaches the first and second lateral position values may be independently used to control the tape head actuator as desired. For example, operation 1418 may include implementing the first and/or second lateral position values in one or more track-following servo control loops, e.g., as shown in FIG. 9.

It should also be noted that in some approaches more than two lateral position values may be calculated from respective lateral position estimates, and used to control a tape head actuator. Depending on the desired approach, a third, fourth, fifth, sixth, etc. lateral position value may be calculated from respective lateral position estimates, and used to control a tape head actuator. According to an illustrative approach which is in no way intended to limit the invention, method 1400 may further include receiving lateral position estimates from a third servo channel, calculating a third lateral position value by using a third number of lateral position estimates received from the third servo channel, the third number of lateral position estimates according to the number of lateral position estimates, and using the third lateral position value along with the lateral position value and the second lateral position value to control the tape head actuator. Moreover, as alluded to above, each of the lateral position estimates from the third servo channel is preferably determined from a respective sub-frame of a third timing based servo track on the magnetic tape.

Track-following servo control loops may operate at different frequencies, e.g., depending on one or more factors such as the speed of tape, the number of lateral position estimates used to calculate a lateral position value, dimensions of the servo patterns in a servo pattern (e.g., track), etc. Looking to FIG. 15, a flowchart of a method 1500 involving track-following control loops is illustrated in accordance with one embodiment. The method 1500 may be performed in accordance with the present invention in any of the environments depicted in FIGS. 1-11, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

Figure 15:
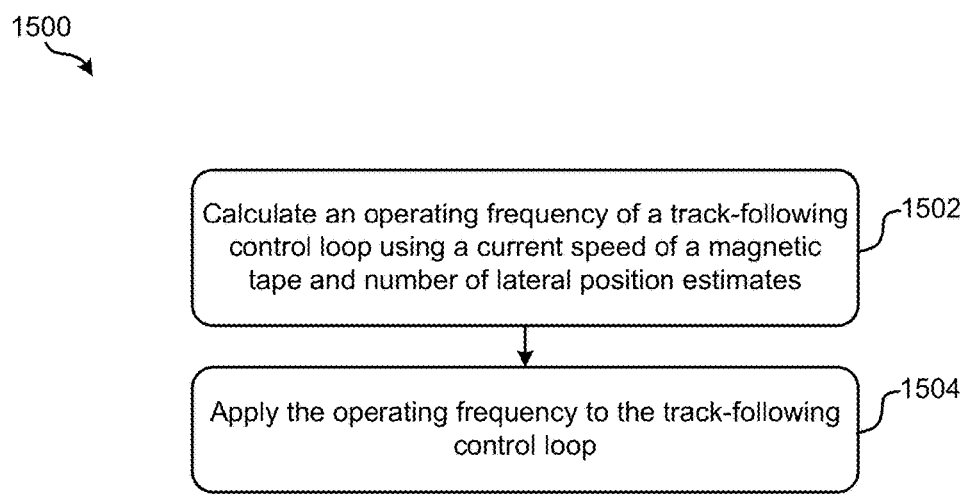
FIG. 15 is a flowchart of a method, according to one embodiment.

As shown in FIG. 15, operation 1502 of method 1500 includes calculating an operating frequency of a track-following control loop using a current speed of a magnetic tape and number of lateral position estimates. According to an exemplary approach, which is in no way intended to limit the invention, the operating frequency of the track-following control loop may be calculated using Equation 2 below.

$$f = \frac{v_i}{(SFL \times c_i)} \qquad \text{Equation 2}$$

Here, "f" represents the operating frequency which may be measured in Hz, while "$v_i$" corresponds to the current speed of the magnetic tape which may be measured in meters per second. Moreover, "SFL" corresponds to a length of a sub-frame of a TBS track on the magnetic tape (e.g., see SFL of FIG. 4B) which may be measured in meters, and "$c_i$" corresponds to the number of lateral position estimates (e.g., the sampling rate) determined to be used to calculate a lateral position value as described above. Depending on the desired approach, Equation 2 may be implemented by a controller, a processor, etc., or some other device having one or more processors therein which may be implemented as part of a tape drive.

Referring still to method 1500, operation 1504 includes applying the operating frequency to the track-following control loop, e.g., as seen in FIG. 9.

It should be noted that although the various embodiments included above are described with reference to determining a lateral position value, any one or more of these embodiments may be implemented to form other values (estimates) that are desirable in order to perform efficient servo control, e.g., including a velocity value, a magnetic tape skew value (relative to an orientation of a magnetic head), etc. Accordingly, any one or more of the embodiments described herein may further include receiving additional estimates from one or more servo channels. For instance, the additional estimates may include magnetic tape velocity estimates derived from a TBS, magnetic tape skew estimates (relative to an orientation of the magnetic head) derived from a TBS, etc., depending on the desired approach.

It follows that various embodiments described herein are able to achieve tape-speed dependent servo performance optimization by taking advantage of the trade-off between estimation delay (frequency) and estimation noise (resolution). As a result, improved PES performance is achieved at high tape speeds while at the same time keeping the update rate low and the position estimation resolution high. As described above, this may be achieved by using multiple lateral position estimates from one or more servo readers to calculate the lateral position of the tape head. Moreover, a servo channel (and/or firmware) may be used to calculate several lateral position estimates to improve the resolution of the estimate, e.g., by reducing the noise in the estimate. This allows a control loop to operate at a lower operation frequency, while improving PES performance. However, for lower tape speeds, each lateral position estimate may be used to control the position of a tape head relative to a magnetic medium, e.g., due to the delay associated with low tape speeds.

These improvements are particularly apparent when compared to the conventional limits on PES performance. Specifically, conventional implementations are forced to drop position estimates when faced with high tape speeds in view of the clock rate of the microprocessor and the computation complexity of the track-following controller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
   determining a number of lateral position estimates to use for calculating a lateral position value;
   receiving lateral position estimates from a single servo channel;
   calculating the lateral position value by using the number of lateral position estimates; and
   using the lateral position value to control a tape head actuator.

2. The tape drive-implemented method as presented in claim 1, comprising:
   determining a current speed of a magnetic tape,
   wherein determining the number of lateral position estimates is based on the current speed of the magnetic tape.

3. The tape drive-implemented method as presented in claim 2, wherein the number of lateral position estimates is also based on at least one parameter selected from a group of parameters consisting of: a vibration condition, media type, and an environmental condition.

4. The tape drive-implemented method as presented in claim 1, wherein each of the lateral position estimates is determined from a respective sub-frame of a timing based servo track on a magnetic tape.

5. The tape drive-implemented method as presented in claim 4, comprising:

storing at least some of the lateral position estimates in memory; and retrieving the stored lateral position estimates from the memory to calculate the lateral position value.

6. The tape drive-implemented method as presented in claim 1, comprising:

receiving lateral position estimates from a second servo channel;

calculating a second lateral position value by using a second number of lateral position estimates received from the second servo channel, the second number of lateral position estimates according to the number of lateral position estimates, wherein each of the lateral position estimates from the single servo channel is determined from a respective sub-frame of a timing based servo track on a magnetic tape, wherein each of the lateral position estimates from the second servo channel is determined from a respective sub-frame of a second timing based servo track on the magnetic tape; and using the second lateral position value along with the lateral position value to control the tape head actuator.

7. The tape drive-implemented method as presented in claim 1, comprising:

calculating an operating frequency of a track-following control loop using a current speed of a magnetic tape and number of lateral position estimates; and applying the operating frequency to the track-following control loop.

8. The tape drive-implemented method as presented in claim 1, comprising:

receiving additional estimates from the servo channel;

calculating a supplemental value using the received additional estimates; and using the supplemental value to control a tape head actuator, wherein the supplemental value is selected from a group consisting of: a current speed of a magnetic tape, and a magnetic tape skew value.

9. The tape drive-implemented method as presented in claim 1, wherein calculating the lateral position value includes: calculating an arithmetic mean of the lateral position estimates, or calculating a weighted average of the lateral position estimates.

10. A computer program product comprising a computer readable storage medium having program instructions embodied therewith, the program instructions executable by a processor to cause the processor to:

determine, by the processor, a number of lateral position estimates to use for calculating a lateral position value;

receive, by the processor, lateral position estimates from a single servo channel;

calculate, by the processor, the lateral position value using the number of lateral position estimates; and use, by the processor, the lateral position value to control a tape head actuator.

11. The computer program product as presented in claim 10, the program instructions executable by the processor to cause the processor to:

determine, by the processor, a current speed of a magnetic tape, wherein determining the number of lateral position estimates is based on the current speed of the magnetic tape.

12. The computer program product as presented in claim 11, wherein the number of lateral position estimates is also based on at least one parameter selected from a group of parameters consisting of: a vibration condition, media type, and an environmental condition.

13. The computer program product as presented in claim 10, wherein each of the lateral position estimates is determined from a respective sub-frame of a timing based servo track on a magnetic tape.

14. The computer program product as presented in claim 13, the program instructions executable by the processor to cause the processor to:

store, by the processor, at least some of the lateral position estimates in memory; and retrieve, by the processor, the stored lateral position estimates from the memory to calculate the lateral position value.

15. The computer program product as presented in claim 10, the program instructions executable by the processor to cause the processor to:

receive, by the processor, lateral position estimates from a second servo channel;

calculate, by the processor, a second lateral position value by using a second number of lateral position estimates received from the second servo channel, the second number of lateral position estimates according to the number of lateral position estimates, wherein each of the lateral position estimates from the single servo channel is determined from a respective sub-frame of a timing based servo track on a magnetic tape, wherein each of the lateral position estimates from the second servo channel is determined from a respective sub-frame of a second timing based servo track on the magnetic tape; and use, by the processor, the second lateral position value along with the lateral position value to control the tape head actuator.

16. The computer program product as presented in claim 15, the program instructions executable by the processor to cause the processor to:

receive, by the processor, lateral position estimates from a third servo channel;

calculate, by the processor, a third lateral position value by using a third number of lateral position estimates received from the third servo channel, the third number of lateral position estimates according to the number of lateral position estimates, wherein each of the lateral position estimates from the third servo channel is determined from a respective sub-frame of a third timing based servo track on the magnetic tape; and use, by the processor, the third lateral position value along with the lateral position value and the second lateral position value to control the tape head actuator.

17. The computer program product as presented in claim 10, the program instructions executable by the processor to cause the processor to:

calculate, by the processor, an operating frequency of a track-following control loop using a current speed of a magnetic tape and the number of lateral position estimates; and apply, by the processor, the operating frequency to the track-following control loop.

18. The computer program product as presented in claim 10, the program instructions executable by the processor to cause the processor to:

receive, by the processor, additional estimates from the servo channel;

calculate, by the processor, a supplemental value using the received additional estimates; and use, by the processor, the supplemental value to control a tape head actuator, wherein the supplemental value is selected from a group consisting of: a current speed of a magnetic tape, and a magnetic tape skew value.

19. A tape drive, comprising:
a controller comprising logic integrated with and/or executable by the controller to cause the controller to:
determine a number of lateral position estimates to use for calculating a lateral position value;
receive lateral position estimates from a single servo channel;
calculate a lateral position value by using the number of lateral position estimates; and
use the lateral position value to control a tape head actuator.

20. The tape drive as presented in claim 19, the logic integrated with and/or executable by the controller to cause the controller to:
receive lateral position estimates from a second servo channel;
calculate a second lateral position value by using a second number of lateral position estimates received from the second servo channel, the second number of lateral position estimates according to the number of lateral position estimates, wherein each of the lateral position estimates from the single servo channel is determined from a respective sub-frame of a timing based servo track on a magnetic tape, wherein each of the lateral position estimates from the second servo channel is determined from a respective sub-frame of a second timing based servo track on the magnetic tape;
use the second lateral position value along with the lateral position value to control the tape head actuator;
calculate an operating frequency of a track-following control loop using a current speed of a magnetic tape and the number of lateral position estimates;
apply the operating frequency to the track-following control loop; and
determine a current speed of a magnetic tape,
wherein determining the number of lateral position estimates is based on the current speed of the magnetic tape,
wherein each of the lateral position estimates is determined from a respective sub-frame of a timing based servo track on the magnetic tape.

* * * * *